Jan. 10, 1956  A. O. BRUESTLE ET AL  2,730,347
CUTTER BAR CONSTRUCTION AND ADJUSTMENT THEREFOR
Filed Oct. 31, 1952
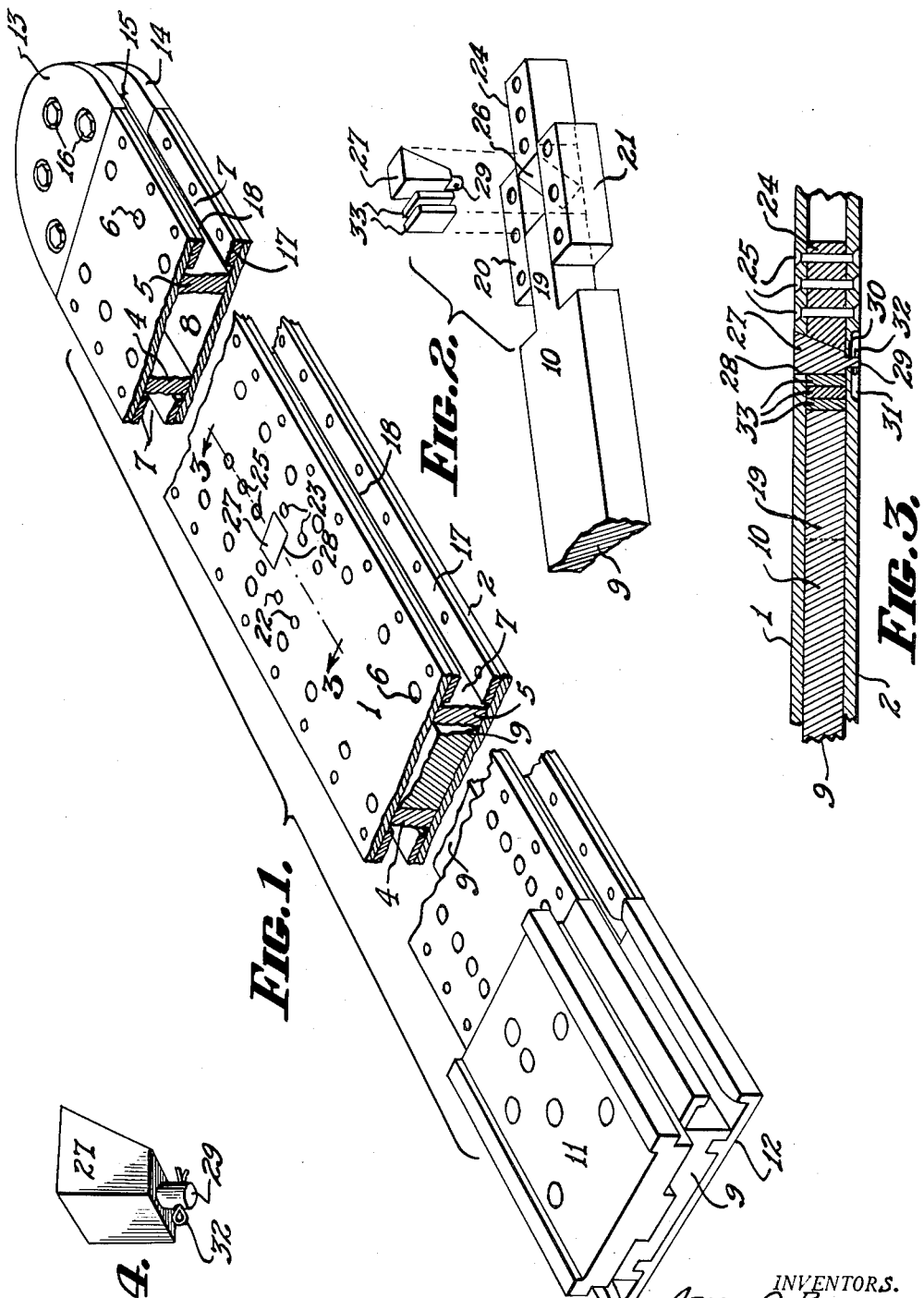
INVENTORS.
ARMIN O. BRUESTLE
AND CLAUDE B. KREKELER,
BY Allen + Allen
ATTORNEYS.

ized Jan. 10, 1956

2,730,347
CUTTER BAR CONSTRUCTION AND ADJUSTMENT THEREFOR

Armin O. Bruestle and Claude B. Krekeler, Cincinnati, Ohio, assignors to The Cincinnati Mine Machinery Company, Cincinnati, Ohio, a corporation of Ohio Application October 31, 1952, Serial No. 318,042

5 Claims. (Cl. 262—33)

Our invention has to do with the construction of cutter bars such as are employed in the cutting machines used for mining coal and the like. As is well known, in such apparatus a portable machine supplying motive power has mounted on it a projecting cutter bar. A chain carrying cutter bits runs in channels around the cutter bar and around a sprocket connected with the source of motive power. The cutter assemblies are employed in such exemplary operations as undercutting a seam of coal preparatory to loosening a portion of the coal by blasting.

The cutter bars may take various forms depending upon the use to which they will be put. In some types of mining machinery the cutter bar is rigidly mounted to the machine itself so that the machine must be moved to advance the cutter bar in a cutting direction transverse its length. In other types of machinery the cutter bar may be pivotally mounted to the machine body so that it may be swung in the direction of cut. Variations in the construction of cutter bars also occur depending on the types of chain and cutter bits employed, the thickness of the cut, and the like. These variations do not constitute limitations upon the present invention; and while we shall describe our invention in connection with a cutter bar which is rigidly mounted on the machine body, it will be apparent to the skilled worker in the art how the teaching herein may be adapted to cutter bars of other types.

Our invention has for an object the provision of improvements in cutter bars and especially the provision of simpler, more advantageous, and more positive means for the adjustment of the cutter bar.

It will be understood that cutter bars must be adjustable longitudinally to take up slack in the chains with which they are used and in particular to accommodate those variations in chain length which may occur either due to wear in the pivots or to the substitution of any parts. Hitherto provision has been made for such adjustment by means of threaded members. Not only do such members show some tendency toward loosening under the intense vibrations to which cutter bars are subjected, but they also are relatively inconvenient to use. The adjustment means must be confined wholly to the body of the cutter bar; the threaded element must be engaged by a suitable wrench inserted through an opening in one of the body plates of the cutter bar; and while covers are frequently employed, there is a strong tendency for fine materials such as coal dust to accumulate around the adjustment means inside the cutter bar, making operation difficult.

It is an object of our invention to provide an adjustment means which may be operated without special tools, which is not interfered with by the conditions of dust and dirt to which the cutter bar is subjected, which permits ready adjustment in spite of substantial back-pull, and which permits adjustment to be made very rapidly and with a minimum of effort.

These and other objects of our invention which will be set forth hereinafter or will be apparent to one skilled in the art upon reading these specifications, we accomplish by that construction and arrangement of parts of which we shall now describe the aforesaid exemplary embodiment. Reference is made to the accompanying drawings wherein:

Figure 1 is a perspective view with parts in section of a cutter bar constructed in accordance with our invention.

Figure 2 is a partial perspective with certain parts in exploded position, showing mechanism within the cutter bar.

Figure 3 is a partial sectional view taken along the section line 3—3 of Figure 1.

Figure 4 is a perspective view on a larger scale of a wedge element which we may employ.

The exemplary cutter bar has an elongated body comprising a top plate 1 and a bottom plate 2 which are held in spaced relationship by rails 4 and 5. The plates and rails may be held together by rivet elements 6 at suitable intervals, with heads countersunk in the plates.

The rails 4 and 5 are spaced inwardly from the edges of the plates as shown to provide grooves 7 in which the cutter chain rides; and the rails are also spaced from each other so as to provide an elongated passageway or channel within the body of the cutter bar and indicated at 8 in Figure 1.

The cutter bar body is supported by an elongated member, called a bar hanger, extending within this channel or passageways a sufficient distance to rigidify the cutter bar with respect to a base or means of attachment to the mining machine body. The bar hanger is indicated in our figures at 9. It has at least a forward portion 10 of a size and shape to fit relatively snugly within the channel or passageway 8. One end of the bar hanger projects beyond the cutter bar body and is there provided with some suitable means for attachment to the machine. In the illustrative embodiment we have shown plates 11 and 12 riveted to the protruding end of the bar hanger, these elements forming collectively an attachment or mounting means which we shall hereinafter for convenience refer to as the base of the cutter bar.

At the end of the cutter bar body opposite the base there is a so-called cutter head usually formed of upper and lower cutter head plates 13 and 14 of semicircular formation held apart by a cutter head shoe 15 having a front portion which is semi-circular and of lesser radius so as to continue the chain groove 7 around the cutter head, and a rearwardly extending portion (not shown) which lies between and is riveted to the top and bottom cutter bar plates 1 and 2. The cutter head plates 13 and 14 are normally held to the cutter head shoe 15 by countersunk bolts 16.

Our cutter bar may have other features of construction current in the art but forming no limitation on the present invention. Thus the inner surfaces of the top and bottom body plates may if desired be lined with hardened steel wear strips 17 and 18; and if desired back wall wear strips may similarly be riveted to the outer surfaces of the rails 4 and 5 at the base of the chain groove 7.

In a preferred form of our adjusting means, as most clearly shown in Figures 2 and 3, the forward end of the bar hanger 9 is provided with a head extension 19. This head extension is so dimensioned as to slide between a pair of guide members 20 and 21 which are positioned between the top and bottom plates 1 and 2 of the cutter bar and are securely held in place as by rivets 22 and 23. A thrust block 24 is also positioned between the top and bottom plates and is securely held in place as by rivets 25. It will be noted that the rear end of the thrust block extends somewhat between the guide elements 20 and 21. The head extension 19 of the bar hanger is so dimensioned as to slide in a channel or passageway formed by the guides 20 and 21 and the top and bottom plates of the cutter bar body. The cutter bar body may be adjusted as to effective length with respect to the cutter bar chain by sliding it in and out on the bar hanger, and as this occurs the head extension 19 on the bar hanger will slide in and out in the channel aforesaid.

Either the rearward end of the thrust block 24 or the forward end of the bar hanger extension 19 is beveled as at 26; and the construction is employed in connection with a wedge element 27. This element has a body, preferably rectangular in cross section, and so dimensioned as to fit between the guide members 20 and 21. Opposite faces of the wedge element are configured to conform with the mating faces of the bar hanger head extension 19 and the thrust block 24 which means that one or both of these faces will be beveled. The wedge operates through a rectangular hole 28 in the top plate 1. It has a lower extension 29, preferably cylindrical and of reduced dimensions so that it may be passed through a similarly shaped hole 30 in a countersunk portion 31 of the lower plate 2 of the cutter bar. The longitudinal dimensions of the wedge element are such that when it is fully seated as shown in Figures 1 and 3 its top surface will coincide with the upper surface of the top plate 1, while the extension 29 passes through the hole 30 in the bottom plate, there being sufficient depth to the countersink 31 to permit the use of a retainer in the form of a cotter pin 32, passing through a hole in the extension 29, neither the extension nor the cotter pin protruding substantially, if at all, beyond the lower surface of the bottom plate. The wedge element fits the holes in both plates sufficiently snugly to minimize the infiltration of dust and dirt.

It will be evident that when the wedge element 27 is seated, it will enforce a minimum separation of the thrust block 24 and the bar hanger extension 19. As the cutter chain (not illustrated) wears, an effective elongation of the cutter bar will be required to maintain tightness. When this occurs adjustment is easily effected in the following fashion:

The cotter pin 32 is removed and the wedge dislodged as by tapping on the wedge extension 29. Once the wedge is loosened it may easily be removed. Thereupon one or more shims 33 are inserted in the space left by the withdrawal of the wedge. The wedge is then driven home, resulting in a further interspacing of the ends of the bar hanger extension and the thrust block by the thickness of the shim or shims so inserted. The operation is completed by replacing the cotter pin 32.

While we have shown a cotter pin as one mode of fastening the wedge in place, other expedients may be employed as will be apparent to one skilled in the art. The wedge element by reason of its beveled face or faces serves as a positive means for forcing the bar hanger head extension away from the thrust block and thereby moving the cutter bar body outwardly on the bar hanger. As a consequence it is not ordinarily necessary to move the cutter bar body for adjustment by any other means such as prying it outwardly against the base. The shims are preferably metal members cut so as to have a proper fit in the interspace between the guide members 20 and 21, and of a thickness appropriate for the increments of adjustment ordinarily required; but almost any metal member capable of lying within the channel between the guide blocks will serve in an emergency.

Modifications may be made in our invention without departing from the spirit of it. For example, while we prefer the construction shown in Figure 2, it is readily possible to omit the reduction of the extension 19 on the bar hanger and omit the guide elements 20 and 21, and, through the use of a sufficiently wide thrust block to cause a wedge of suitable width to engage between the thrust block and the reduced end of the bar hanger. The side rails 4 and 5 in this instance act as guide elements.

Having thus described our invention in an exemplary embodiment, what we claim as new and desire to secure by Letters Patent is:

1. In a cutter bar the combination of a cutter bar body having upper and lower plates held apart by spaced rails and forming a central enclosed channel, a bar hanger slidable in said channel to support said cutter bar body in adjusted position, said bar hanger having a reduced forward extension, guide blocks fastened between said plates and spaced to accept the forward end of said extension, a thrust block fastened between said plates and having a portion lying between said guide blocks and opposed to said extension, and a wedge member insertable through an opening in one of said plates and dimensioned so as to lie between said guide blocks and between said extension and said thrust block and wholly between the outer surfaces of said upper and lower plates when seated, and means for holding said wedge member in seated position, said wedge member having at least one beveled face, a mating beveled face being located on one of said first mentioned opposed elements, said wedge member being so dimensioned as substantially to fill said opening in said plate when said wedge member is seated, and at least one shim element insertable through said opening when said wedge member is withdrawn, and dimensioned to lie wholly between said upper and lower plates against one of said first mentioned opposed elements.

2. The structure claimed in claim 1 wherein said wedge element has an extension of reduced dimension from its smaller end, the said extension passing through an orifice in the opposite one of said plates, said plate being relieved about said orifice to permit the engagement of fastening means with said reduced extension.

3. In a cutter bar construction, a cutter bar body having side plates and a central enclosed channel, a bar hanger slidable within said channel for supporting said cutter bar body in adjusted position, said channel containing a thrust abutment off the end of said bar hanger, a wedge member insertable between said abutment and said bar hanger through an opening in a side plate of said cutter bar, said wedge being dimensioned to lie wholly between the outer surfaces of said side plates, whereby shim members, similarly dimensioned may be employed between said wedge and one of said abutment and bar hanger members in order to secure adjustability of the position of said bar hanger, and means for holding said wedge in position.

4. In a cutter bar, the combination of a cutter bar body having upper and lower plates held apart by spaced rails and forming a central enclosed channel, a bar hanger slidable in said channel to support said cutter bar body in adjusted position, said bar hanger having a forward portion, a thrust block fastened between said plates and having an end lying opposite said bar hanger portion, a wedge member insertable through an opening in one of said plates and dimensioned so as to lie between said bar hanger portion and said thrust block, and wholly between the outer surfaces of said upper and lower plates, whereby shim members may be inserted between said bar hanger portion and said wedge member whereby to provide adjustment of the position of said bar hanger portion, said wedge member seating against the other of said plates, and means for holding said wedge member in seated position.

5. The structure claimed in claim 4 wherein said wedge member has one beveled face and one non-beveled face, said thrust block having a correspondingly beveled face, said wedge member being so dimensioned as substantially to fill said opening in said plate when said wedge member is seated, said shim members being insertable against the forward part of said bar hanger whereby said shim elements can be wholly confined between said plates, and means for holding said wedge member in seated position.

References Cited in the file of this patent
UNITED STATES PATENTS

| | | |
|---|---|---|
| 1,857,376 | Hoy | May 10, 1932 |
| 2,218,258 | Ekbom | Oct. 15, 1940 |

FOREIGN PATENTS

| | | |
|---|---|---|
| 359,185 | Great Britain | Oct. 22, 1931 |